(12) United States Patent
Matsui (10) Patent No.: US 10,425,167 B2
(45) Date of Patent: Sep. 24, 2019

(54) COMMUNICATION CONTROL DEVICE AND COMMUNICATION CONTROL SYSTEM

(71) Applicant: FUJITSU LIMITED, Kawasaki-shi, Kanagawa (JP)

(72) Inventor: Hideki Matsui, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/692,624

(22) Filed: Aug. 31, 2017

(65) Prior Publication Data
US 2018/0076902 A1  Mar. 15, 2018

(30) Foreign Application Priority Data
Sep. 12, 2016  (JP) .................................. 2016-177516

(51) Int. Cl.
| | | |
|---|---|---|
| H04B 10/572 | (2013.01) | |
| H04J 14/02 | (2006.01) | |
| H04B 10/532 | (2013.01) | |
| H04B 10/61 | (2013.01) | |
| H04B 10/272 | (2013.01) | |
| H04B 10/556 | (2013.01) | |
| H04B 10/516 | (2013.01) | |

(52) U.S. Cl.
CPC ......... H04B 10/572 (2013.01); H04B 10/272 (2013.01); H04B 10/516 (2013.01); H04B 10/532 (2013.01); H04B 10/556 (2013.01); H04B 10/611 (2013.01); H04J 14/0241 (2013.01)

(58) Field of Classification Search
CPC .. H04B 10/572; H04B 10/272; H04B 10/516; H04B 10/532; H04B 10/556; H04B 10/611; H04J 14/0241
See application file for complete search history.

(56) References Cited

U.S. PATENT DOCUMENTS

| | | | | |
|---|---|---|---|---|
| 5,757,652 A | * | 5/1998 | Blazo ..................... | G01R 29/26 375/371 |
| 7,151,379 B2 | * | 12/2006 | Christensen ............ | H04L 1/205 324/620 |
| 7,961,829 B2 | * | 6/2011 | Shaanan ............... | H04L 7/0054 375/354 |
| 2004/0246124 A1 | * | 12/2004 | Reilly ..................... | G01S 13/56 340/511 |

FOREIGN PATENT DOCUMENTS

JP   2002-111596   4/2002

* cited by examiner

Primary Examiner — Janice N Tieu
(74) Attorney, Agent, or Firm — Fujitsu Patent Center (57) ABSTRACT

First data and second data are transmitted by a simple configuration by including a generation unit that generates a wavelength-changed signal on the basis of the second data, and a transmission unit that transmits the wavelength-changed signal together with a first signal that indicates the first data.

5 Claims, 8 Drawing Sheets

COMMUNICATION CONTROL DEVICE AND COMMUNICATION CONTROL SYSTEM

CROSS-REFERENCE TO RELATED APPLICATION

This application is based upon and claims the benefit of priority of the prior Japanese Patent application No. 2016-177516, filed on Sep. 12, 2016, the entire contents of which are incorporated herein by reference.

FIELD

The embodiment(s) discussed herein is (are) related to a communication control device, a communication control system, and a communication control method.

BACKGROUND

In communication systems in which data communication is performed between devices, techniques to transmit sub-signals (sub-data) such as a monitoring signal and control information together with a main signal (main data) such as calculation data are known.

Figure 8:
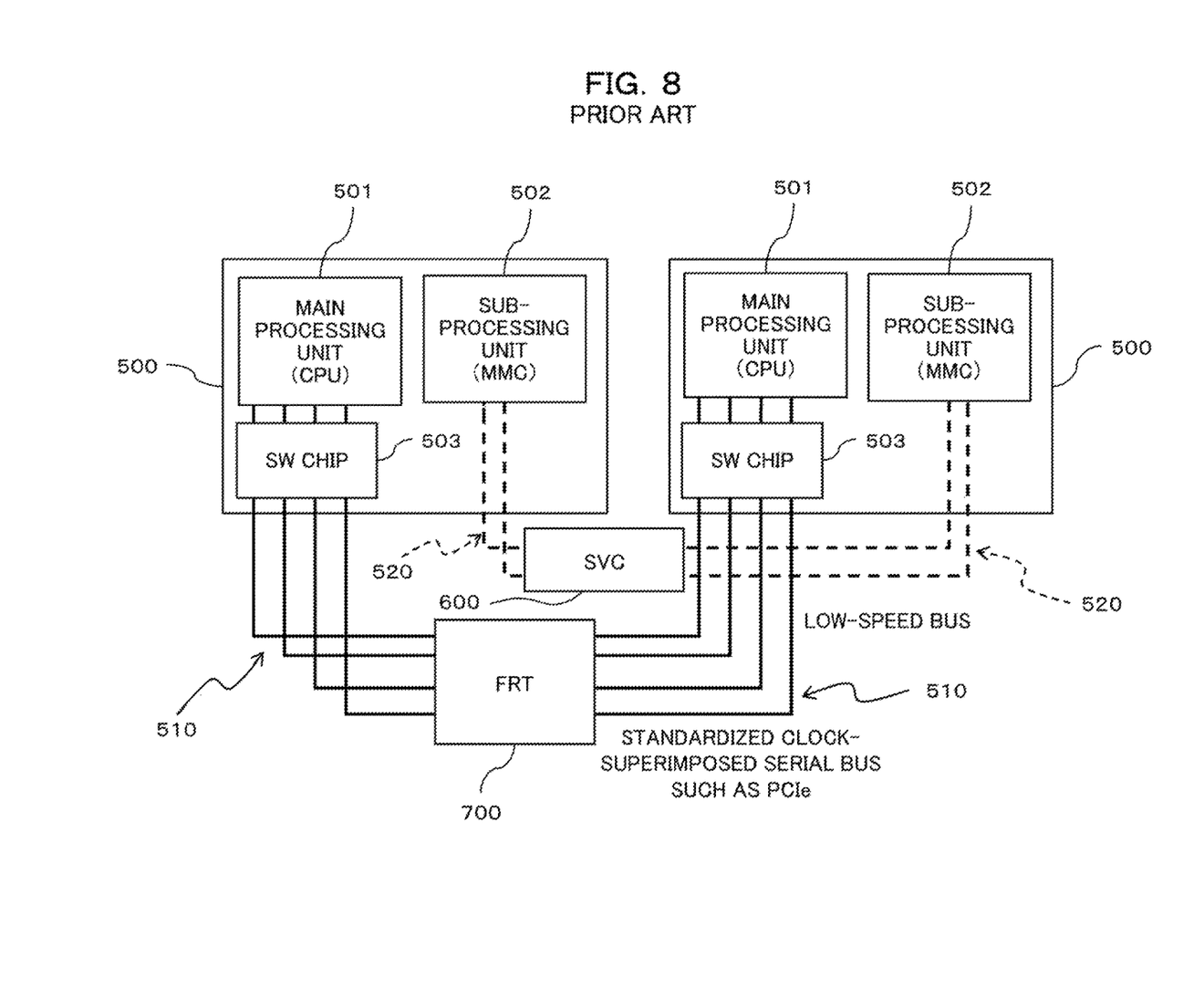
FIG. 8 is a diagram illustrating a communication system in a conventional storage system.

FIG. 8 is a diagram illustrating a communication system in a conventional storage system.

The storage system illustrated in FIG. 8 includes a service controller (SVC) 600, a front-end router (FRT) 700, and two controller modules (CM) 500.

Each of the CMs 500 includes a main processing unit 501, a sub-processing unit 502, and a switch chip (SW chip) 503.

The main processing unit 501 performs calculation regarding a main signal and performs communication control of the main signal. The main processing unit 501 is a central processing unit (CPU), for example.

The sub-processing unit 502 performs calculation regarding a sub-signal and performs communication control of the sub-signal. The sub-processing unit 502 is a module management controller (MMC), for example.

The main processing units 501 of the CMs 500 are respectively connected to buses 510 through the switch chips 503, and the other ends of the buses are connected to the FRT 700. That is, the main processing units 501 of the CMs 500 are communicatively connected with each other through the switch chips 503, the buses 510, and the FRT 700.

The sub-processing units 502 of the CMs 500 are respectively connected to the SVC 600 through buses 520. That is, the sub-processing units 502 of the CMs 500 are communicatively connected with each other through the buses 520 and the SVC 600.

The bus 510 that connects the main processing units 501 through the FRT 700 is at a higher-speed than the bus 520, and a path connected through the bus 510 is referred to as in-band path. In contrast, a path connected through the lower-speed bus 520 than the bus 510 is referred to as out-band path.

The communication system illustrated in FIG. 8 is provided with the in-band path and the out-band path to realize transmission and reception of the main signal and the sub-signal.

Patent Document 1: Japanese Laid-open Patent Publication No. 2002-111596 A

However, such a conventional communication system has a large number of cables because of being provided with the in-band path and the out-band path. Therefore, for example, there is a problem that identification of a suspicious portion is complicated when a trouble occurs.

SUMMARY

Therefore, this communication control device is a communication control device that transmits first data and second data, and includes a generation unit that generates a wavelength-changed signal on the basis of the second data, and a transmission unit that transmits the wavelength-changed signal together with a first signal that indicates the first data.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

Hereinafter, embodiments of the present communication control device and the present communication control system will be described with reference to the drawings. Note that the embodiments described below are merely examples, and do not intend to exclude application of various modifications and technologies that are not specified in the embodiments. That is, the present embodiments can be modified in various manners (such as combining the embodiments and modifications) without departing from the gist of the embodiments and can be implemented. Further, the drawings do not intend that the embodiments include only the configuration elements illustrated in the drawings and can have other functions and the like.

(A) Configuration

Figure 1:
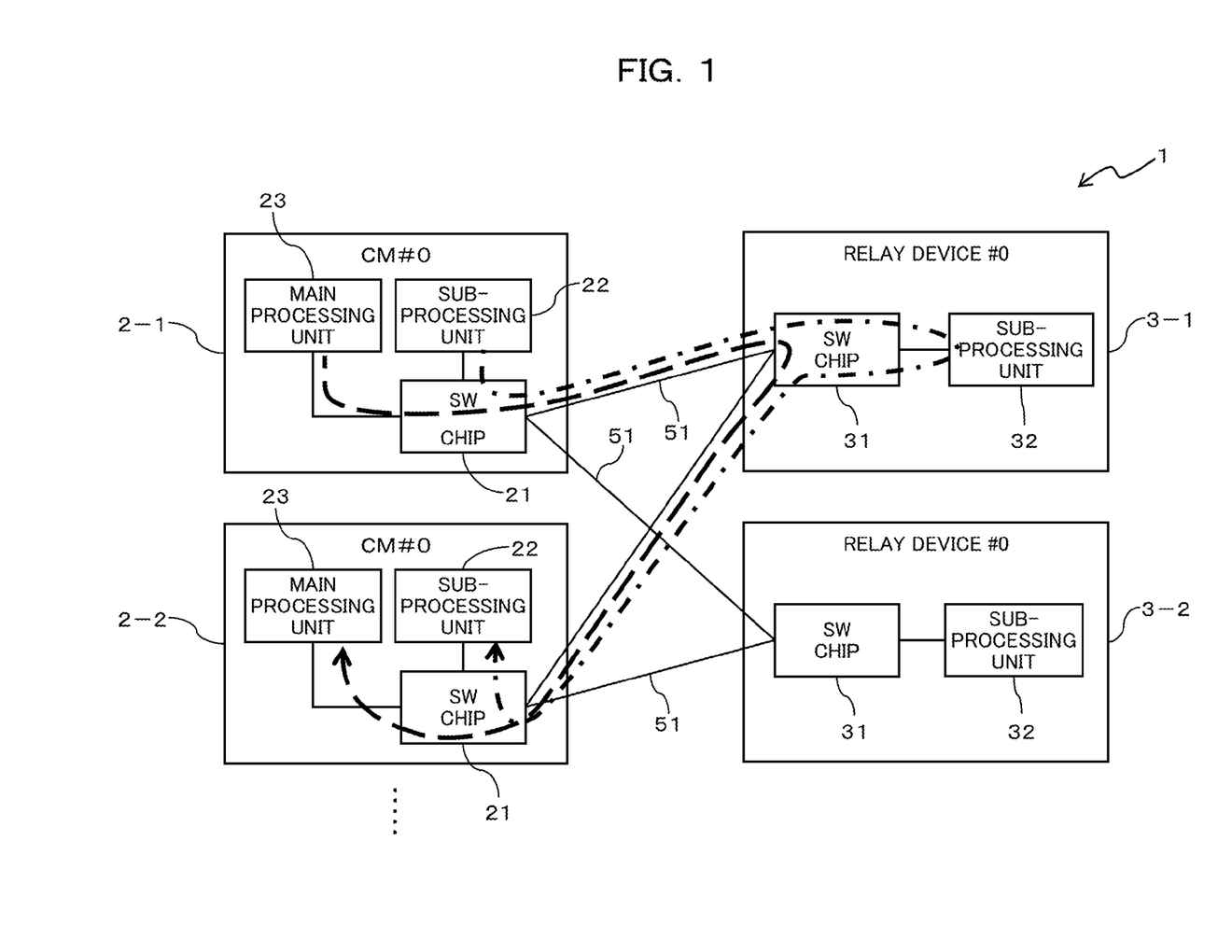
FIG. 1 is a diagram exemplarily illustrating a connection configuration in a storage system as an example of an embodiment.

FIG. 1 is a diagram exemplarily illustrating a connection configuration in a storage system (communication control system) 1 as an example of an embodiment.

In the example illustrated in FIG. 1, the storage system 1 includes a plurality of (two in FIG. 1) CMs (storage control devices) 2-1 and 2-2 and a plurality of (two in FIG. 1) relay devices 3-1 and 3-2.

In such a storage system 1, the plurality of CMs 2-1 and 2-2 and the plurality of relay devices 3-1 and 3-2 are connected with communication cables (PCIe buses) 51 of peripheral component interconnect express (PCIe), for example.

In the present embodiment, a transmission signal including a main signal and a sub-signal is communicated through the communication cable 51, as described below.

[1] CM

The CMs 2-1 and 2-2 are storage control devices that perform various types of control in the storage system 1, such as access control to a storage device such as a hard disk drive (HDD) (not illustrated), according to a storage access request from a host device (not illustrated). The CMs 2-1 and 2-2 have similar configuration to each other.

Note that, hereinafter, as a sign representing CM, the sign 2-1 or 2-2 is used when one of the plurality of CMs needs to be identified, and a sign 2 is used when an arbitrary CM is specified.

Further, hereinafter, the CM 2-1 may be referred to as CM#0. Similarly, the CM 2-2 may be referred to as CM#1.

The CM 2 includes a main processing unit 23, a sub-processing unit 22, and a switch chip (SW chip) 21, as illustrated in FIG. 1.

The main processing unit 23 performs processing such as calculation regarding first data (main data), and inputs and outputs the main signal for transmitting the main data. The main processing unit 23 is, for example, a CPU.

The sub-processing unit 22 performs processing such as calculation regarding second data (sub-data), and inputs and outputs the sub-signal for transmitting the sub-data. The sub-processing unit 22 is, for example, a MMC.

The main processing unit 23 and the sub-processing unit 22 are connected to the communication cables 51 through the switch chip 21, and the other ends of the communication cables 51 are connected to the switch chips 31 of the relay devices 3-1 and 3-2.

The communication cable 51 includes a plurality of communication paths therein. Hereinafter, paths included in the communication cable 51 may be referred to as lanes 223a and 223b (see FIG. 2).

Figure 2:
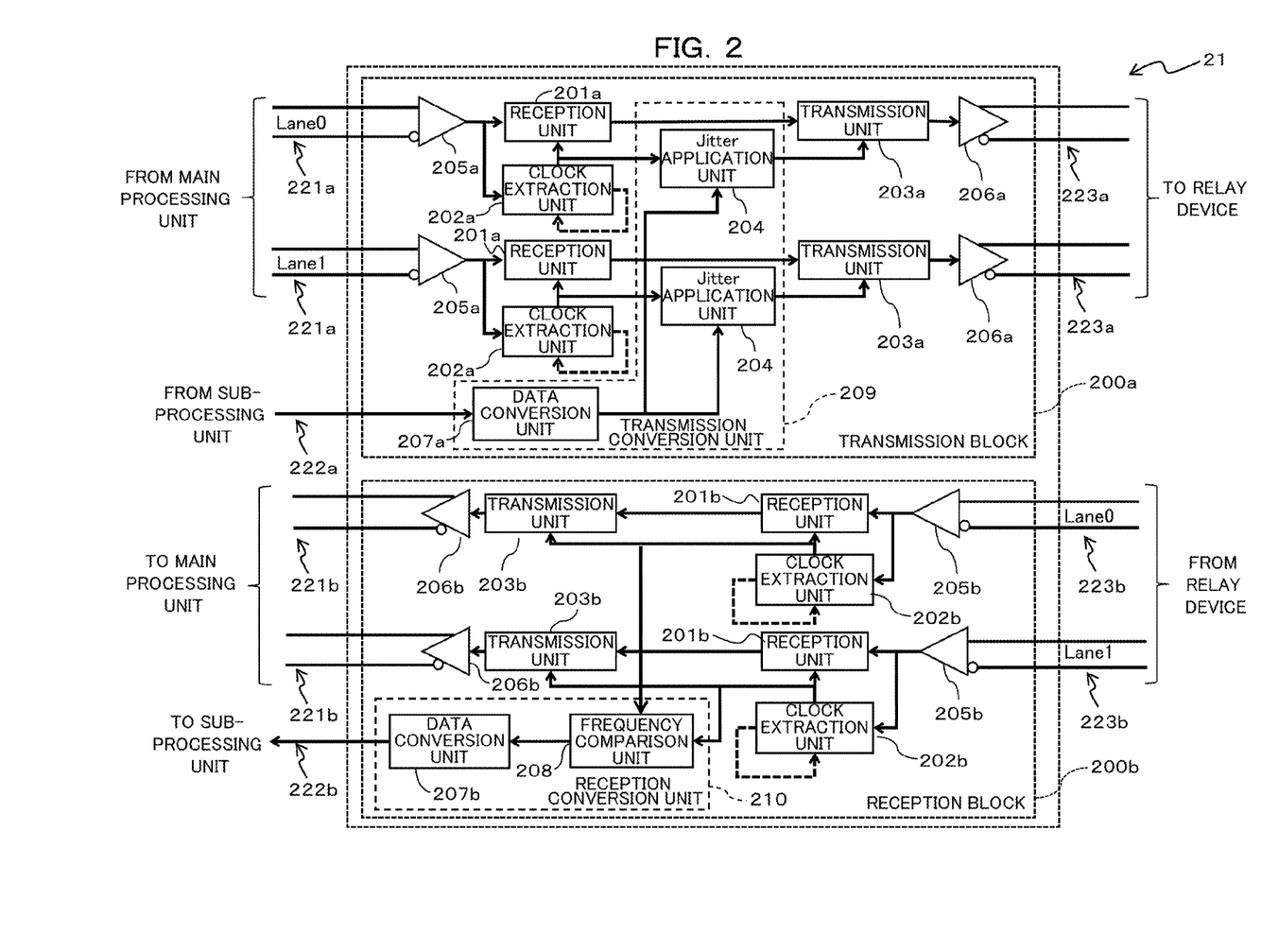
FIG. 2 is a diagram exemplarily illustrating a configuration of a switch chip in a storage system as an example of an embodiment.

Further, the main processing unit 23 and the switch chip 21 are connected with lanes 221a and 221b (see FIG. 2).

The switch chip 21 is a connection device that communicatively connects the CM 2 on which the switch chip 21 itself is mounted (hereinafter, referred to its own CM 2) with another CM 2 (another CM 2) through the communication cable 51 and the relay device 3.

The switch chip 21 functions as a communication control device that transmits the first data (main data) transmitted from the main processing unit 23 and the second data (sub-data) transmitted from the sub-processing unit 22.

The switch chip 21 is connected with the switch chips 31 of the relay devices 3-1 and 3-2 through the communication cables 51.

With the connection, the main processing unit 23 of the CM 2-1 is communicatively connected with the main processing unit 23 of the CM 2-2 through the switch chip 21, the communication cable 51, and the relay device 3.

Similarly, the sub-processing unit 22 of the CM 2-1 is communicatively connected with the sub-processing unit 22 of the CM 2-2 through the switch chip 21, the communication cable 51, and the relay device 3.

FIG. 2 is a diagram exemplarily illustrating a configuration of the switch chip 21 in the storage system 1 as an example of an embodiment.

As illustrated in FIG. 2, the switch chip 21 includes a transmission block 200a and a reception block 200b.

The transmission block 200a processes transmission of data (signals) from its own CM 2 to the relay device 3. In contrast, the reception block 200b processes reception of data (signals) transmitted from the relay device 3 to its own CM 2.

(a) Transmission Block

The main signal from the main processing unit 23 of its own CM 2 is input to the transmission block 200a through one or more (two of Lanes 0 and 1 in the example illustrated in FIG. 2) lanes 221a. Further, the sub-signal from the sub-processing unit 22 of its own CM 2 is input to the transmission block 200a through one or more (one in the example illustrated in FIG. 2) lanes 222a.

Then, a transmission signal including the main signal and the sub-signal is output from the transmission block 200a to the relay device 3 through one or more (two in the example illustrated in FIG. 2) lanes 223a, as described below.

Meanwhile, the transmission signal including the main signal and the sub-signal is input from the relay device 3 to the reception block 200b through one or more (two of Lanes 0 and 1 in the example illustrated in FIG. 2) lanes 223b.

Then, the reception block 200b outputs the main signal to the main processing unit 23 of its own CM 2 through one or more (two in the example illustrated in FIG. 2) lanes 221b. Further, the reception block 200b outputs the sub-signal to the sub-processing unit 22 of its own CM 2 through one or more (one in the example illustrated in FIG. 2) lanes 222b.

The lanes 221a, 221b, 223a, and 223b are serial buses, and transmit a clock-superimposed signal (transmission signal), as described below.

As illustrated in FIG. 2, the transmission block 200a includes a reception unit 201a, a clock extraction unit 202a, a transmission unit 203a, an input port 205a, an output port 206a, a jitter application unit 204, and a data conversion unit 207a.

Among the aforementioned units and ports, the reception unit 201a, the clock extraction unit 202a, the transmission unit 203a, the input port 205a, the output port 206a, and the jitter application unit 204 are provided for each lane 221a.

Further, among the aforementioned units and ports, the jitter application unit 204 and the data conversion unit 207a configure a transmission conversion unit 209 that applies the sub-signal to a clock signal as jitter to generate a jitter-applied clock signal, as described below.

The lane 221a is connected to the input port 205a, the lane 221a connecting the input port 205a and the main processing unit 23, and the main signal output from the main processing unit 23 is input to the input port 205a through the lane 221a.

The lane 223a is connected to the output port 206a, the lane 223a connecting the output port 206a and the relay device 3, and the transmission signal to be output to the relay device 3 is output through the lane 223a.

The main signal input to the input port 205a is input to the reception unit 201a and the clock extraction unit 202a.

The reception unit 201a receives the main signal input to the input port 205a. The main signal received by the reception unit 201a is passed to the transmission unit 203a.

The clock extraction unit 202a extracts a clock superimposed on the received main signal. Note that the extraction of the clock from the main signal can be realized using various known techniques, and description of details of the techniques is omitted.

The clock extracted by the clock extraction unit 202a is input to the jitter application unit 204.

The data conversion unit 207a changes the sub-signal input from the sub-processing unit 22 through the general-purpose bus 222a to a waveform signal (first waveform signal) such as a one-wire serial signal.

The sub-signal is binary data of 0 or 1 (binary signal), and frequency variation becomes sharply changed only by an output of the sub-signal and a phase locked loop (PLL) is not able to follow the frequency variation. Therefore, the data conversion unit 207a blunts the waveform to form a gradually changed waveform, using a low-pass filter (LPF).

That is, the data conversion unit 207a has a function to form the waveform signal into a waveform signal to be used to generate a delay in the clock signal.

The data conversion unit 207a converts the sub-signal input from the sub-processing unit 22 into a waveform signal to be used by the jitter application unit 204 described below to apply jitter.

Figure 3:
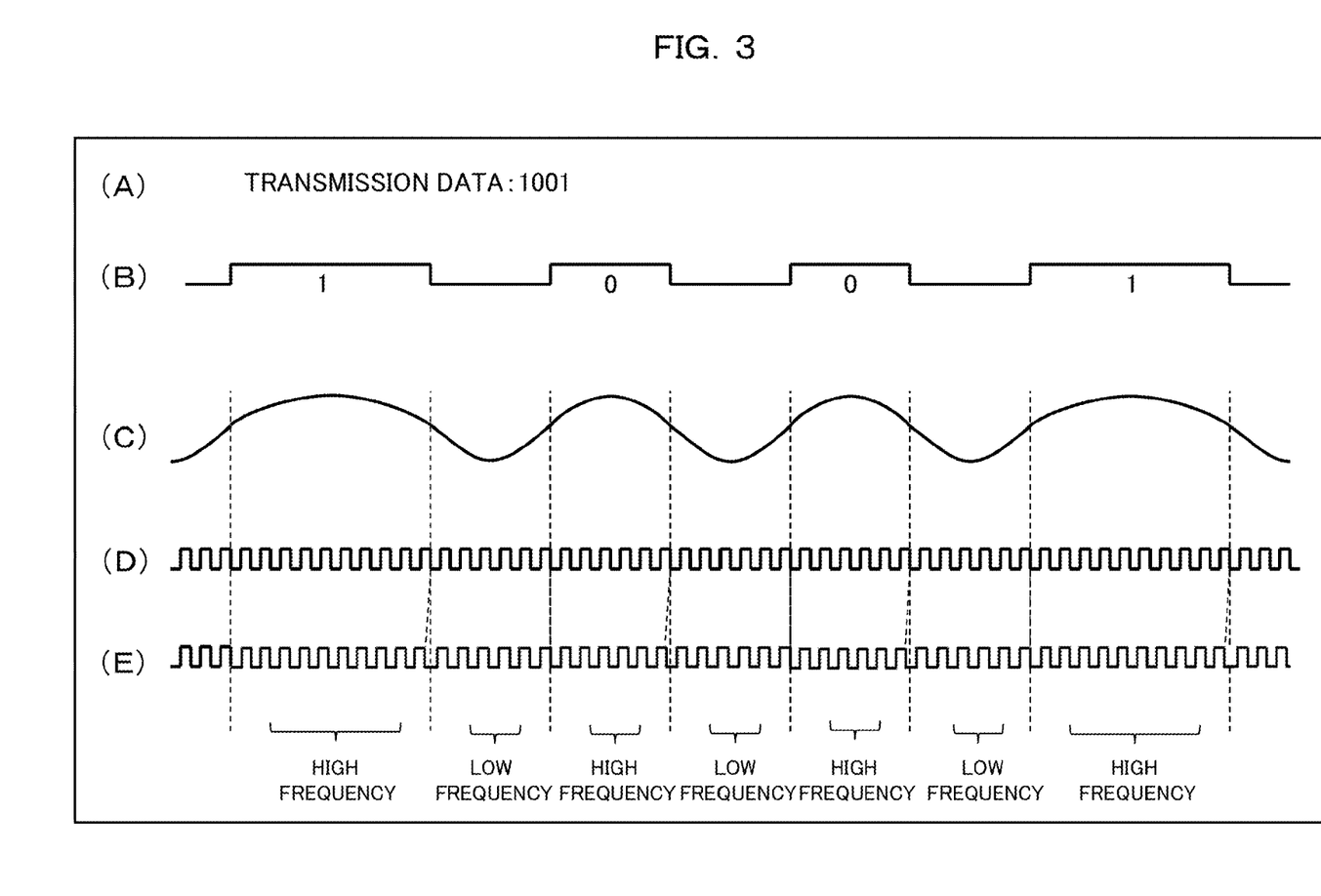
FIG. 3 is a diagram for describing a method of creating a transmission signal in a storage system as an example of an embodiment.

FIG. 3 is a diagram for describing a method of creating a transmission signal in the storage system 1 as an example of an embodiment.

In FIG. 3, the sign (A) illustrates an example of the sub-data (transmission data). In the present example, the sub-data is "1001".

The data conversion unit 207a convers the sub-data into waveform data (sub-signal) (first data conversion processing). The sign (B) illustrates an example in which the sub-signal is converted into a one-wire serial format (one-wire serial signal). In the one-wire serial signal, a state in which High time is longer than a predetermined threshold is "1".

Further, the data conversion unit 207a forms the waveform of the waveform data converted into the one-wire serial signal to become a smooth waveform, using an LPF 2042 (see FIG. 4) described below, as illustrated by the sign (C) in FIG. 3, so as not to affect serial transmission by the main processing unit 23 (second data conversion processing). The waveform signal generated in this way is used to generate (apply) the jitter by the jitter application unit 204 described below. Hereinafter, the waveform signal generated by the data conversion unit 207a on the basis of the sub-signal input from the sub-processing unit 22 may be referred to as jitter control waveform signal.

The jitter application unit 204 applies the jitter to the clock signal extracted from the main processing unit 23 by the clock extraction unit 202a on the basis of the jitter control waveform signal generated by the data conversion unit 207a. The jitter referred here means a difference in wavelength (wavelength change).

That is, the jitter application unit 204 partially changes the wavelength of the clock signal according to the waveform of the jitter control waveform signal. With this change, the jitter application unit 204 generates a portion in a high-frequency state and a portion in a low-frequency state in the clock signal. Hereinafter, the clock signal to which the jitter has been applied may be referred to as jitter-applied clock signal.

The jitter-applied clock signal is a wavelength-changed signal having a high-frequency portion (a portion having a short wavelength) and a low-frequency portion (a portion having a long wavelength) corresponding to the sub-signal.

The jitter application unit 204 applies the jitter to the clock signal of the clock superimposing serial bus on the basis of the jitter control waveform signal generated by the data conversion unit 207a.

Figure 4:
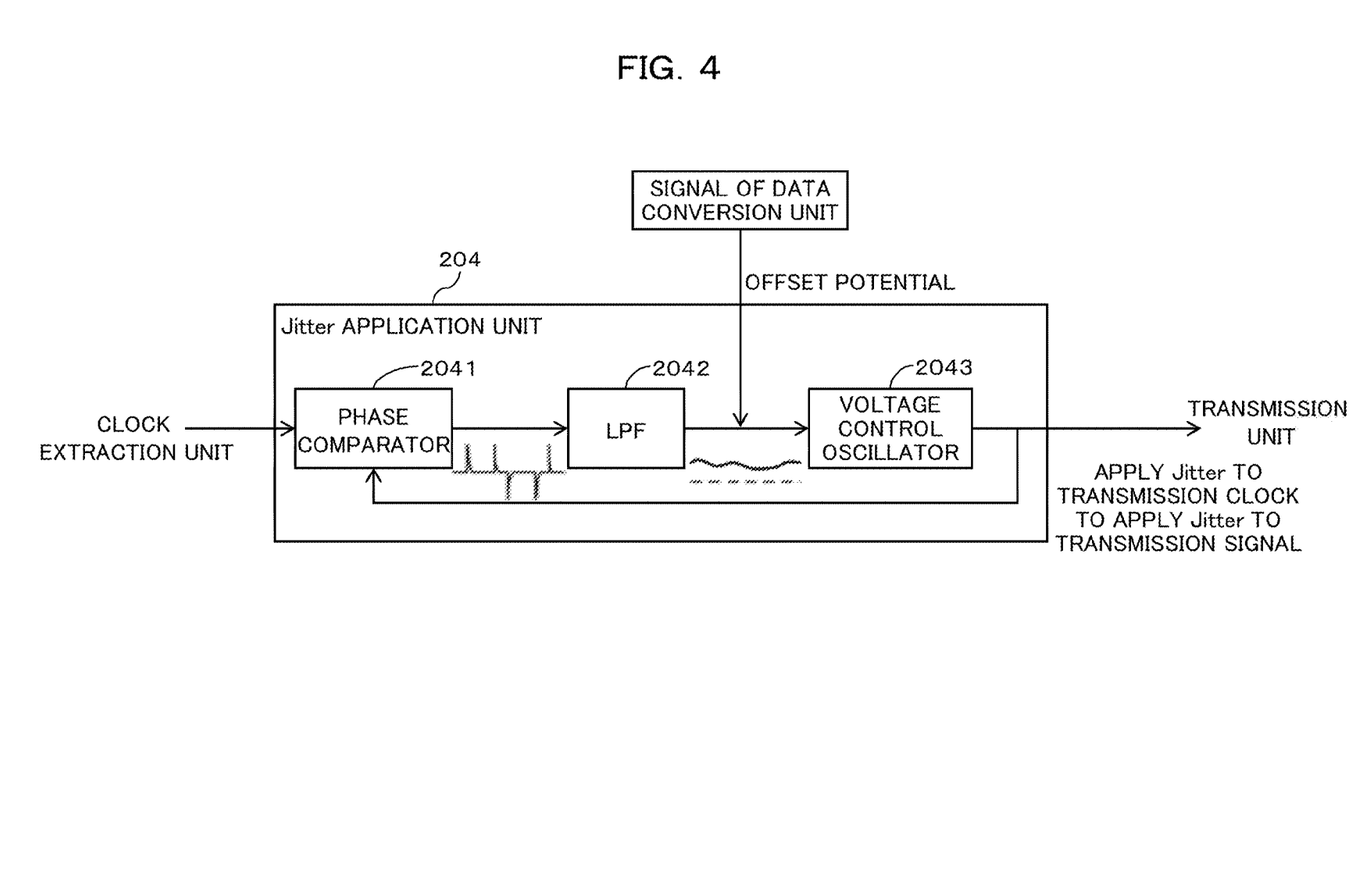
FIG. 4 is a diagram illustrating a configuration of a jitter application unit in a storage system as an example of an embodiment.

FIG. 4 is a diagram illustrating a configuration of the jitter application unit 204 in the storage system 1 as an example of an embodiment.

As illustrated in FIG. 4, the jitter application unit 204 has functions as a phase comparator 2041, the LPF 2042, and a voltage control oscillator 2043.

The clock signal extracted from the main signal by the clock extraction unit 202a and the jitter-applied clock signal output from the jitter application unit 204 (voltage control oscillator 2043) are input to the phase comparator 2041. The phase comparator 2041 detects a phase difference between the clock signal and the jitter-applied clock signal, and outputs a voltage signal according to the phase difference.

The LPF 2042 is provided downstream of the phase comparator 2041, and the voltage signal output from the phase comparator 2041 is averaged (smoothed) by the LPF 2042.

In the jitter application unit 204, the jitter control waveform signal generated by the data conversion unit 207a is synthesized with an output signal from the LPF 2042, and a voltage value is offset according to the jitter control waveform signal.

Then, the output signal from the LPF 2042, the output signal having been synthesized with the jitter control waveform signal, is input to the voltage control oscillator 2043.

The voltage control oscillator 2043 is an oscillator that changes an output oscillation frequency according to an input voltage, and outputs a signal (transmission signal) having a frequency according to the jitter control waveform signal to be synthesized with the output signal of the LPF 2042. For example, the voltage control oscillator 2043 outputs a high frequency wave in a high value (voltage value) in the jitter control waveform signal, and outputs a low frequency wave in a low value in the jitter control waveform signal.

In FIG. 3, the sign (D) illustrates a waveform of the clock signal before application of the jitter, and the sign (E) illustrates a waveform of the jitter-applied clock signal. That is, the sign (E) illustrates a waveform of the clock signal in a state of being applied the jitter according to the jitter control waveform signal.

The jitter application unit 204 makes the wavelength of the main signal in a section corresponding to HIGH (1) in the jitter control waveform signal short to cause the clock signal to be in a high-frequency state. Further, the jitter application unit 204 makes the wavelength of the main signal in a section corresponding to LOW (0) in the jitter control waveform signal long to cause the main signal to be in a low-frequency state.

In this way, the sub-signal is built in (applied to) the clock signal as the jitter in the jitter-applied clock signal.

Note that, in the example illustrated by the sign (E) in FIG. 3, the deviation portion appears to be several wavelengths for convenience of scale. In reality, the deviation is caused in the level of 1000 to 10000 wavelengths, and the difference between the high-frequency portion and the low-frequency portion in the transmission signal is clear.

The transmission unit 203a superimposes the jitter-applied clock signal (transmission clock) to which the jitter has been applied by the jitter application unit 204 to the main signal input from the main processing unit 23 to generate the transmission signal, and transmits the generated transmission signal to the relay device 3. In the present storage system 1, the jitter according to the sub-signal is applied to the transmission clock signal, and the jitter-applied clock signal is superimposed to the main signal, so that the sub-signal is superimposed to the main signal, using the jitter.

It also can be said that, in the present storage system 1, the jitter according to the sub-signal is applied to the transmission clock signal, so that the jitter according to the sub-signal is applied to the transmission signal (main signal) to be transmitted.

(b) Reception Block

The transmission signal from the relay device 3 is input to the reception block 200b through one or more (two in the example illustrated in FIG. 2) lanes 223b. As described above, in the transmission signal, the clock signal including the sub-signal is superimposed to the main signal, using the jitter. The reception block 200b extracts the main signal and the sub-signal from the received transmission signal.

The reception block 200b inputs the main signal extracted from the transmission signal to the main processing unit 23 through one or more (two in the example illustrated in FIG. 2) lanes 221b. Further, the reception block 200b extracts the sub-signal from the transmission signal, and inputs the extracted sub-signal to the sub-processing unit 22 through one or more (one in the example illustrated in FIG. 2) lanes 222b.

The lane 223b is a serial bus similar to the lane 223a, and transmits a clock-superimposed signal (transmission signal).

As illustrated in FIG. 2, the reception block 200b includes a reception unit 201b, a clock extraction unit 202b, a transmission unit 203b, an input port 205b, an output port 206b, a frequency comparison unit 208, and a data conversion unit 207b.

Among the units and ports, the reception unit 201b, the clock extraction unit 202b, the transmission unit 203b, the input port 205b, and the output port 206b are provided for each lane 221b.

Further, among the units and ports, the data conversion unit 207b and the frequency comparison unit 208 configure a reception conversion unit 210 that extracts the sub-signal from the received jitter-applied clock signal, as described below.

The lane 223b is connected with the input port 205b, the lane 223b connecting the input port 205b and the relay device 3, and the transmission signal transmitted from the relay device 3 is input through the lane 223b.

The lane 221b is connected with the output port 206b, the lane 221b connecting the output port 206b and the main processing unit 23, and the transmission signal to be output to the main processing unit 23 is output through the lane 221b.

The transmission signal input to the input port 205b is input to the reception unit 201b and the clock extraction unit 202b.

The reception unit 201b receives the transmission signal input to the input port 205b. The reception unit 201b extracts the main signal from the received transmission signal. The main signal extracted by the reception unit 201b is passed to the transmission unit 203b, and is input to the main processing unit 23 through the output port 206b.

The clock extraction unit 202b extracts the clock signal (jitter-applied clock signal) from the received transmission signal. Note that the extraction of the clock from the transmission signal can be realized using various known techniques, and description of details of the techniques is omitted.

The jitter-applied clock signal extracted by the clock extraction unit 202b is input to the transmission unit 203b and the frequency comparison unit 208. In the example illustrated in FIG. 2, the jitter-applied clock signals are respectively input to the transmission units 203b and the frequency comparison unit 208 from the clock extraction units 202 provided for each of the plurality of lanes 223b.

The frequency comparison unit 208 extracts the jitter control waveform signal from the jitter-applied clock signal.

Figure 5:
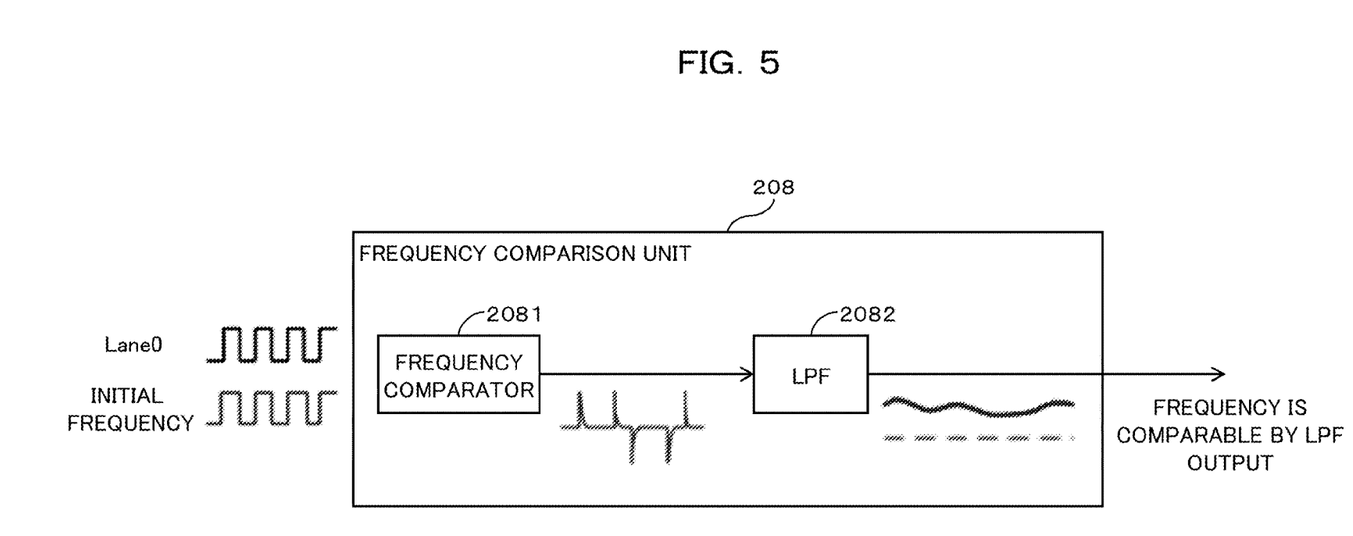
FIG. 5 is a diagram illustrating a configuration of a frequency comparison unit in a storage system as an example of an embodiment.

FIG. 5 is a diagram illustrating a configuration of the frequency comparison unit 208 in the storage system 1 as an example of an embodiment.

The frequency comparison unit 208 includes a frequency comparator 2081 and an LPF 2082, as illustrated in FIG. 5.

The frequency comparator 2081 compares a reference clock signal and the jitter-applied clock signal extracted by the clock extraction unit 202a to detect deviation of frequency, and is realized by an XOR circuit, for example.

As the reference clock signal, a clock signal in a state of being not applied the jitter is input for a predetermined period (10 seconds, for example) at the time of start of the present storage system 1, and the frequency and the phase of the clock signal are stored in a memory (not illustrated). The reference clock signal indicates an initial frequency of the clock signal.

Figure 6:
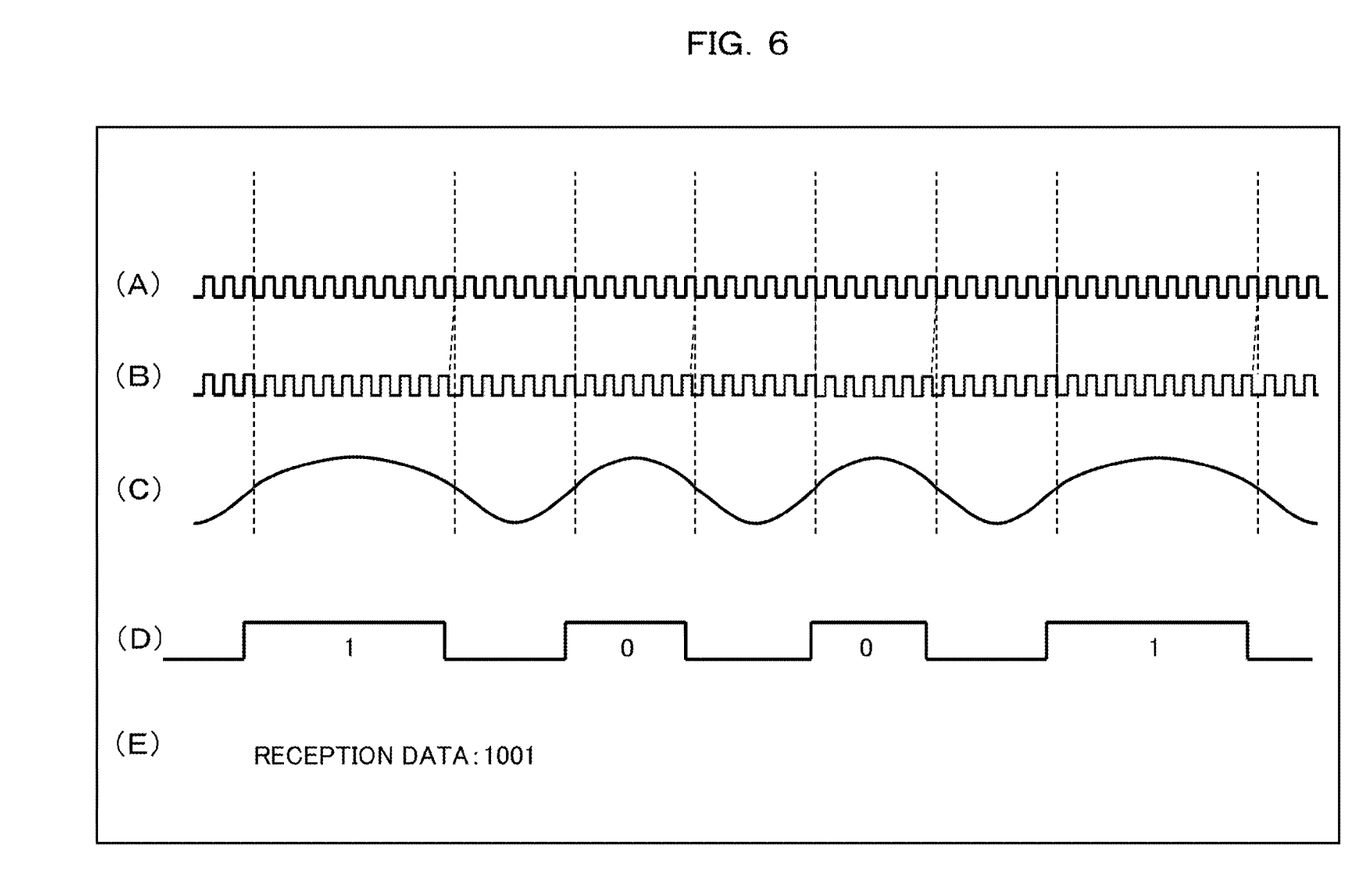
FIG. 6 is a diagram for describing a method of processing a jitter-applied block signal in a storage system as an example of an embodiment.

FIG. 6 is a diagram for describing a method of processing the jitter-applied clock signal in the storage system 1 as an example of an embodiment.

In FIG. 6, the sign (A) exemplarily illustrates the reference clock signal, the sign (B) exemplarily illustrates the jitter-applied clock signal, and the sign (C) exemplarily illustrates the output signal of the frequency comparison unit 208, respectively. Further, the sign (D) exemplarily illustrates the one-wire serial signal generated by the data conversion unit 207b, and the sign (E) illustrates a data example of the sub-signal.

The frequency comparator 2081 detects a difference in frequency between the reference clock signal (see the sign (A) in FIG. 6) and the jitter-applied clock signal (see the sign (B) in FIG. 6), and outputs the voltage signal according to the phase difference. For example, the frequency comparator 2081 outputs High when the jitter-applied clock signal has a higher frequency than the reference clock signal.

The LPF 2082 is provided downstream of the frequency comparator 2081, and the signal output from the frequency comparator 2081 is averaged (smoothed) by the LPF 2082 and is output as waveform data of a smooth curve (see the sign (C) in FIG. 6).

The data conversion unit 207b converts the signal input from the frequency comparison unit 208 into a general-purpose bus signal (sub-data) that can be received by the sub-processing unit 22.

The data conversion unit 207b forms the waveform data generated by the frequency comparison unit 208 to generate the one-wire serial signal. For example, the data conversion unit 207b binarizes the waveform data generated by the frequency comparison unit 208 by cutting and dividing the waveform data by a predetermine threshold to generate the one-wire serial signal (sub-signal) (see the sign (D) in FIG. 6).

The data conversion unit 207b then converts the sub-signal expressed by the one-wire serial signal into numerical form to acquire the sub-data (see the sign (E) in FIG. 6). In the example illustrated by the sign (E) in FIG. 6, the sub-data "1001" is acquired. The acquired sub-data is input to the sub-processing unit 22 through the lane 222b.

Further, the data conversion unit 207b has a function to discriminate, for the output of the frequency comparison unit 208, deviation of frequency due to normal disturbance and deviation of frequency caused by application of the jitter by the jitter application unit 204 (that is, the sub-signal), using a threshold.

Further, the data conversion unit 207b discriminates, for the output from the frequency comparison unit 208, the deviation of frequency due to normal disturbance and the deviation of frequency according to the present invention, using a threshold.

Figure 7:
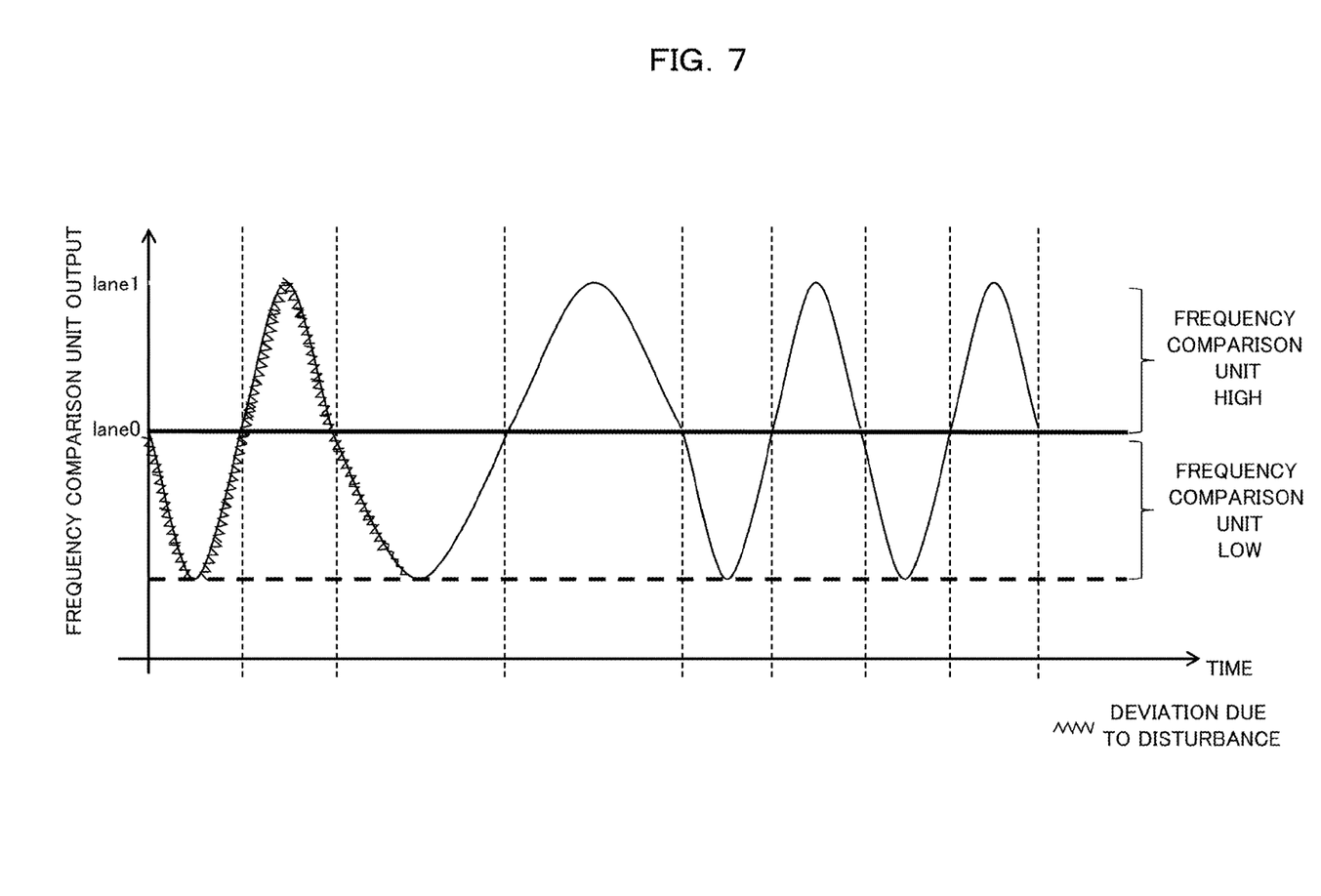
FIG. 7 is a diagram for describing processing of discriminating deviation by a data conversion unit in a storage system as an example of an embodiment.

FIG. 7 is a diagram for describing processing of discriminating the deviation by the data conversion unit 207b in the storage system 1 as an example of an embodiment. FIG. 7 exemplarily illustrates the output signal from the frequency comparison unit 208, and the deviation due to disturbance is partially illustrated in the output signal.

For example, in PCIe, the deviation of frequency up to 0.03% is allowed by the standard, for example. Meanwhile, the deviation of frequency caused by application of the jitter by the jitter application unit 204 is about 3%. Therefore, the data conversion unit 207b can remove only the deviation due to disturbance without affecting the sub-signal applied as the jitter, by performing filtering with the threshold of about 0.03%, for example.

[2] Relay Device

The relay devices 3-1 and 3-2 are communication devices that realize communication (communication between CM-CM) between the plurality of CMs 2-1 and 2-2. The relay devices 3-1 and 3-2 have similar configurations to each other.

Note that, hereinafter, as a sign representing the relay device, the sign 3-1 or 3-2 is used when one of the plurality of relay devices needs to be identified, and a sign 3 is used when an arbitrary relay device is specified.

Further, hereinafter, the relay device 3-1 may be referred to as relay device #0. Similarly, the relay device 3-2 may be referred to as relay device #1.

In the example illustrated in FIG. 1, the relay device 3 includes a switch chip (SW chip) 31 and a sub-processing unit 32.

The switch chip 31 is a circuit device that switches a communication path of data, and outputs data input through the communication cable 51 connected to a first connector (not illustrated), from another communication cable 51 connected to a second connector according to a transmission destination (communication partner) of the data. With this configuration, the relay device 3 realizes a function as the FRT.

Further, the switch chip 31 has similar functions to the reception block 200b and the transmission block 200a of the switch chip 21 of the CM 2.

That is, the switch chip 31 receives the transmission signal transmitted from the CM 2, the transmission signal being obtained by applying the sub-signal to the main signal as the jitter, and extracts the main signal and the sub-signal from the transmission signal. The sub-signal extracted in the switch chip 31 is passed to the sub-processing unit 32.

The sub-processing unit 32 performs calculation regarding the sub-signal and performs communication control of the sub-signal. In the relay device 3, the sub-processing unit 32 realizes the function of the SVC.

The sub-signal output from the sub-processing unit 32 is applied to passed to the switch chip 31 and is applied to the clock signal as the jitter by the function of the switch chip 31, and is sent to the CM 2.

(B) Operation

A method of transmitting and receiving data between the CMs 2 in the storage system 1 configured as descried above as an example of an embodiment. In the example below, an example of transmitting data from the CM#0 to the CM#1 through the relay device #0 will be described.

In the CM#0 as a data transmission source, the main processing unit 23 inputs the main signal to the switch chip 21 through the lane 221a.

The main signal from the main processing unit 23 is input from the lanes 221a to the input port 205a. The main signal input to the input port 205a is input to the reception unit 201a and the clock extraction unit 202a.

The clock extraction unit 202a extracts the clock signal from the main signal. The extracted clock signal is input to the jitter application unit 204.

Meanwhile, the sub-processing unit 22 inputs the sub-signal to the switch chip 21 through the general-purpose bus 222a. The sub-signal input through the lane 222a is input to the data conversion unit 207a of the transmission conversion unit 209.

The data conversion unit 207a converts the data input through the general-purpose bus 222a into the one-wire serial signal, and then generates the jitter control waveform signal. The generated jitter control waveform signal is input to the jitter application unit 204.

The jitter application unit 204 applies the jitter to the clock signal extracted from the main processing unit 23 by the clock extraction unit 202a on the basis of the jitter control waveform signal generated by the data conversion unit 207a to generate the jitter-applied clock signal. The jitter-applied clock signal generated in the jitter application unit 204 is input to the transmission unit 203a.

The reception unit 201a to which the main signal has been input inputs the main signal to the transmission unit 203a. The transmission unit 203a superimposes the jitter-applied clock signal input from the jitter application unit 204 to the input main signal to generate the transmission signal, and transmits the generated transmission signal to the relay device 3 through the lane 223a.

In the relay device 3, the switch chip 31 extracts the main signal and the sub-signal from the input transmission signal.

That is, the switch chip 31 extracts the clock signal (jitter-applied clock signal) from the input transmission signal, similarly to the reception block 200b of the switch chip 21. The switch chip 31 compares the jitter-applied clock signal with the reference clock signal to detect the deviation of frequency, and further smooths the jitter-applied clock signal to generate the waveform data of a curve.

The switch chip 31 then generates the one-wire serial signal on the basis of the generated waveform data, and then generates (extracts) the sub-signal on the basis of the one-wire serial signal.

The extracted sub-signal is input to the sub-processing unit 32 and is processed in the sub-processing unit 32.

Further, the switch chip 31 outputs the main signal extracted from the transmission signal to the CM#1 as a transmission destination, by the function as the FRT.

The relay device 3 superimposes the jitter-applied clock signal created on the basis of the sub-signal generated by the sub-processing unit 32, to the main signal to be transmitted to the CM#1. The jitter-applied clock signal is generated by a technique similar to the transmission conversion unit 209 of the transmission block 200a of the switch chip 21 of the CM 2.

Note that the relay device 3 may transfer the transmission signal transmitted from the CM#0 to the CM#1 as it is. That is, the relay device 3 may transmit the jitter-applied clock signal superimposed to the main signal in the CM#0 to the CM#1 as it is, instead of superimposing the jitter-applied clock signal generated on the basis of the sub-signal generated by the sub-processing unit 32 to the main signal.

In the CM#1 as a data transmission destination, the transmission signal is input from the relay device 3 to the input port 205b through the lane 223b. The transmission signal input to the input port 205b is input to the reception unit 201b and the clock extraction unit 202b.

The reception unit 201b inputs the main signal included in the transmission signal to the transmission unit 203b. The transmission unit 203b transmits the input main signal from the output port 206b to the main processing unit 23 through the lane 221b. The main processing unit 23 processes the input main signal.

Meanwhile, the clock extraction unit 202b extracts the clock signal (jitter-applied clock signal) from the input transmission signal. The extracted jitter-applied clock signal is input to the frequency comparison unit 208 of the reception conversion unit 210.

In the frequency comparison unit 208, the frequency comparator 2081 compares the reference clock signal and the jitter-applied clock signal to detect the deviation of frequency, and the waveform data smoothed by the LPF 2082 is output.

In the data conversion unit 207b, the one-wire serial signal is generated on the basis of the input waveform data, and then the sub-signal is generated on the basis of the one-wire serial signal.

The generated sub-signal is input to the sub-processing unit 22 through the lane 222b.

(C) Effect

A described above, according to the storage system 1 as an embodiment of the present invention, the sub-signal is applied to the clock signal as the jitter, and the jitter-applied clock signal is generated in the transmission conversion unit 209. Then, the transmission unit 203 superimposes the generated jitter-applied clock signal to the main signal, and transmits the superimposed signal.

With the configuration, the sub-signal can be transmitted using the lanes 223a and 223b that are the same as the main signal, and the number of cables used for data transmission can be decreased. Further, a special device for transmission of the sub-signal is unnecessary, and the device cost can be decreased.

Further, the sub-signal can be transmitted without using the function of the main processing unit 23. Therefore, for example, even if the main processing unit 23 is hung for some reason, the sub-signal can be transmitted.

(D) Others

The disclosed technology is not limited to the above-described embodiment, and can be modified and implemented in various manners without departing from the gist of the present embodiment. The configurations and processing of the present embodiment can be sifted through as needed or may be appropriately combined.

In the above-described embodiment, the example in which the CM 2 and the relay device 3 are connected through the communication cable of PCIe has been described. However, an embodiment is not limited thereto, and the embodiment can be modified and implemented in various manners.

For example, the embodiment can be applied to various bus standards such as InfiniBand, Serial Attached SCSI (SAS), Serial Advanced Technology Attachment (SATA), and Fibre Channel (FC), in addition to PCIe, as the high-speed serial bus.

Further, the present embodiment can be implemented and manufactured by a person skilled in the art according to the above-described disclosure.

According to an embodiment, the first data and the second data can be transmitted by a simple configuration.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication control device that transmits first data and second data, the communication control device comprising:
   a generation unit that generates a wavelength-changed signal having a high-frequency portion and a low-frequency portion that correspond to the second data; and
   a transmission unit that transmits the wavelength-changed signal together with a first signal representing the first data,
   the generation unit includes
      a data conversion unit that creates a wavelength change control waveform signal based on a second signal representing the second data, and
      an oscillation control unit that generates a clock signal to which a wavelength change according to the second data is applied by generating the high-frequency portion and the low-frequency portion through partially changing an output oscillation frequency of a clock signal according to a waveform of the wavelength change control waveform signal, and
   the transmission unit superimposes the clock signal to which the wavelength change has been applied to the first signal and transmits the superimposed signal.

2. The communication control device according to claim 1, further comprising:
   a reception unit that receives the first signal and the wavelength-changed signal, and
   a restoration unit that restores the second signal from the received wavelength-changed signal.

3. The communication control device according to claim 2, wherein
   the restoration unit creates a waveform signal according to deviation of frequency between the wavelength-changed signal and a reference signal, binarizes the waveform signal to generate a second signal representing the second data, and converts the second signal into numerical form to restore the second data.

4. A communication control system including a first device and a second device, and in which the first device transmits first data and second data to the second device, wherein
   the first device includes
   a generation unit that generates a wavelength-changed signal having a high-frequency portion and a low-frequency portion that correspond to the second data related to the first data, and
   a transmission unit that transmits the wavelength-changed signal together with a first signal representing the first data, and
   the second device includes
   a reception unit that receives the first signal and the wavelength-changed signal, and
   a restoration unit that restores the second data from the received wavelength-changed signal,
   the generation unit in the first device includes a data conversion unit that creates a wavelength change control waveform signal based on a second signal representing the second data, and an oscillation control unit that generates a clock signal to which a wavelength change according to the second data is applied by generating the high-frequency portion and the low-frequency portion through partially changing an output oscillation frequency of a clock signal according to a waveform of the wavelength change control waveform signal, and the transmission unit in the first device superimposes the clock signal to which the wavelength change has been applied to the first signal and transmits the superimposed signal.

5. The communication control system according to claim 4, wherein, in the second device, the restoration unit creates a waveform signal according to deviation of frequency between the wavelength-changed signal and a reference signal, binarizes the waveform signal to generate a second signal representing the second data, and converts the second signal into numerical form to restore the second data.

* * * * *